United States Patent [19]

Winstead

[11] 4,307,049
[45] Dec. 22, 1981

[54] METHOD FOR THE CONTINUOUS FORMATION OF BIAXIALLY ORIENTED THERMOPLASTIC MATERIALS AND FORMING ARTICLES THEREFROM BY INTERMITTENT FORMING MEANS INTERFACED THEREWITH

[75] Inventor: Thomas W. Winstead, Baltimore, Md.

[73] Assignee: Maryland Cup Corporation, Owings Mills, Md.

[21] Appl. No.: 117,510

[22] Filed: Feb. 1, 1980

[51] Int. Cl.³ .......................................... B29N 19/00
[52] U.S. Cl. ................................. 264/37; 264/210.7; 264/290.2
[58] Field of Search .................. 264/37, 210.7, 290.2, 264/292.2

[56] References Cited

U.S. PATENT DOCUMENTS

| | | | |
|---|---|---|---|
| 2,895,171 | 7/1959 | Holmes-Walker et al. | 264/210.7 |
| 3,223,764 | 12/1965 | Kahn et al. | 264/210.7 |
| 3,448,183 | 6/1969 | Chisholm | 264/37 |
| 3,884,748 | 5/1975 | Anderson | 264/290.2 |
| 4,250,129 | 2/1981 | Winstead | 264/37 |

Primary Examiner—James R. Hall
Attorney, Agent, or Firm—Birch, Stewart, Kolasch and Birch

[57] ABSTRACT

A method for continuously extruding, biaxially orienting and intermittently forming molded products from a web of thermoplastic material and further, continuously separating the products from the web selvage, stacking and handling the products and recycling the web selvage for further extrusion. The method uses intermittent molding and biaxial orientation devices into which configuration the continuously extruded web is interfaced by continuous-to-intermittent interfacing loop arrangement which preserves the dimensional and orientational integrity of the web maintains sufficient thermal stability therein to provide molded products which are free from defects such as stretch marks and other inertial and thermal discontinuities normally anticipated in cases of intermittent web advance of thermoplastic material at thermoformable temperature levels.

29 Claims, 5 Drawing Figures

METHOD FOR THE CONTINUOUS FORMATION OF BIAXIALLY ORIENTED THERMOPLASTIC MATERIALS AND FORMING ARTICLES THEREFROM BY INTERMITTENT FORMING MEANS INTERFACED THEREWITH

FIELD OF THE INVENTION

This invention relates to methods for biaxially orienting thermoplastic materials such as polystyrene and more particularly, to a continuous method and apparatus for extruding webs of such material and forming objects therefrom by interfacing the continuous extrusion process with intermittent orientation and forming means.

BACKGROUND OF THE INVENTION

The specifics of the following discussion and specification refer to oriented polystyrene material, hereinafter referred to as OPS but it should be expressly understood that the process constituting the present invention is applicable to a wide variety of thermoplastic materials, polymers or mixtures of polymers including such materials as polymers of ethylene, polypropylene, styrene, vinyl chloride, etc.

While individual materials have problems which are often peculiar to those materials and hamper commercial exploitation of them, the polystyrene materials exhibit low-cost, high stiffness and excellent transparency when properly oriented and the proper molecular orientation further enhances the polystyrene material by removing its inherent brittleness in the absence of molecular orientation.

There are various prior art approaches to mitigating the brittleness factor in polystyrene materials, by the use of impact modifiers and the like. However, this decreases the stiffness, eliminates transparency and increases the cost significantly.

Therefore, prior art approaches to remedy the brittleness problem and increase the impact resistance of polystyrene result in certain undesirable properties which did not exist prior to the addition of such modifiers.

Accordingly, if such materials could be used in a relatively unmodified state in manufacturing sheets or strips of this material in a continuous extruding process in which biaxial orientation is imparted to this material and then, without destroying the basic continuity of the process, mold articles or otherwise form articles from it, all of the desirable physical properties of the material could be realized. At the same time all of the desirabilities, speed and efficiencies of a substantially continuous extrusion and forming process could be realized in the ultimate product cost.

This integrated approach which combines continuous extrusion, and sequentially orientating and forming in rapid succession is the crux of the present invention.

Heretofore, the conventional approaches such as with foam sheet materials and non-foamed or non-cellular sheet materials has been to first produce sheeting, store it in rolled form and terminate the initial process at that point. Then, subsequently, the sheeting is unrolled, reheated and ultimately formed into products or articles in its reheated state. As with all thermoplastic techniques, there are three basic interrelated variables involved in processing thermoplastic materials which affect both the nature of the operation and the characteristics of the final product. These variables are temperature, time and physical state, with the latter variable dealing with pressure, stress, etc.

As a general rule, temperature and time should be minimized variables because extended heat history can materially affect the properties of an end product. In the case of OPS, for example, the temperature at which the material must be oriented represents a compromise between levels which are best from a flow point of view and levels which are best from a stress (orientation) point of view. Once a stress is imposed at a given temperature, for example, a molecular orientation is achieved. However, the longer the increment of time involved between the achievement of that orientation and a subsequent operation, the more stress (orientation) will again be relaxed. Accordingly, the degree of orientation of a particular material is not necessarily a sole function of the amount of heat stretching applied to that material to create the orientation since relaxation of that orientation may simultaneously be taking place.

Therefore, a high speed, integrated approach is unique and important not only from a standpoint of cost but also from the standpoint of results heretofore not otherwise attainable.

These inherent advantages of a high speed integrated approach are important in relatively thin products such as those with wall thicknesses of 0.005 to 0.010 inches and become increasingly significant with products having wall thicknesses greater than 0.010 inches. This is due to the fact that conventional systems as heretofore defined, necessarily involve not only greater time/temperature exposure during the production of sheeting from which the ultimate products are formed, but also involve the reheating and subsequent recooling of the sheet during the subsequent forming operation. Accordingly, the relief of stress occurs during reheating and subsequent recooling as well as during a possible relaxation during the production of the sheeting per se.

Theoretically, the ideal process would be to biaxially orient the thermoplastic material, form and cool it simultaneously. In conventional systems, the time factor is significant and therefore detrimental. Accordingly, the shorter the time factor the less detrimental the effect thereof on the maintenance of a stressed or oriented condition of the material.

Of the conventional methods employed for the production of articles made from material which is biaxially oriented, perhaps the most popular and widely used prior art system involves the extrusion of a sheet from a slot die onto a roll, the temperature of the said roll being controlled, and then through a series of additional rolls which first bring the sheet to an appropriate temperature level for orientation and then longitudinally stretch the sheet between two rolls running at different speeds. This longitudinal stretching or drafting orients the material in the machine direction. The material with the longitudinal orientation is then passed onto a tenter frome to orient it transversely in a manner well-known in the art. Since conventional tentering involves large, heavy equipment, it is also necessary that temperatures be maintained in the sheeting through the use of large, expensive ovens. After the sheeting has been oriented both longitudinally and transversely, it is then rolled and stored for subsequent use.

The forming of OPS sheeting is usually carried out on non-rotating thermoforming equipment with special provisions for the OPS material. It is necessary that the reheating of the sheeting as it is fed into the forming equipment be maintained uniformly throughout its width and lengths. As the material reaches a satisfactory forming temperature, the stresses which have been imposed during the biaxial orientation must be resisted by adequate clamping devices in order to preclude the sheet from shrinking back to its original dimensions and losing the orientation therein.

Since most non-rotary forming equipment is necessarily intermittent in its operation, the intermittent feeding of oriented sheet in such conventional forming equipment imposes inherent difficulties in the creation and maintenance of uniform temperature conditions throughout the forming area of the sheet.

There are several other approaches which have been used to some extent in the production of biaxially oriented sheeting. One of these, the bubble process, is typically the way much thermoplastic film is produced. By proper control of temperature and stretching, it is possible to produce a biaxially oriented film or sheet using this bubble technique. However, in practice it is proven to be very critical because of temperature uniformity requirements. Also this technique is not usable when it comes to thicker material such as that used in thermoformed articles or products on the order of meat trays, containers and tableware.

Further, there is some equipment in use which simultaneously stretches transversely and longitudinally. This equipment obviates the use of longitudinal stretching rolls such as those previously described, but it has certain disadvantages, namely, the amount of selvage which must be discarded due to the increased scalloped effect resulting from clamps which are necessarily moved further apart in the longitudinal direction in order to achieve such a simultaneous biaxial stretching action.

The molecular orientation of thermoplastic materials, as previously indicated results in significant improvements in many of the characteristics of certain of these materials. Biaxial orientation is essential in most packaging and disposable products. If orientation is only in one direction, even though properties may be substantially improved in that direction, they are reduced in the other dimensions. Typical of products which are oriented in one direction only are monofilaments and fibers. During orientation, the molecules in the material are shifted from random coil entanglement to a relative alignment parallel to principal axes of stretch. This results in significant improvements in physical properties, optical properties and in improved barrier properties and stress crack resistance.

For example, among the physical property improvements, the impact strength in materials such as OPS are improved on the order of ten times with two to three times the tensile strength of non-oriented polystyrene and as much as three times the improvement in yield elongation.

There is a definite need in the art to combine the advantages of continuous extrusion with intermittent orienting and forming systems due to the wide availability of such intermittent systems and the capital investments which they represent. Furthermore, such intermittent systems are familiar and basically reliable equipment which have a market acceptance and good will that keep them in demand.

Accordingly, the need is established to interface the continuous extruding systems for thermoplastics such as OPS with intermittent orienters and formers while meticulously preserving the integrity of dimension and orientation of the continuously produced thermoplastic material.

The thermal stability of the oriented thermoplastic material is also critical if the heat of extrusion and orientation is to be preserved in the continuously produced web of thermoplastic to a sufficient degree to permit intermittent forming and cooling in the intermittent forming apparatus.

It is therefore an object of the present invention to provide a new and novel method for forming thermoplastic products by continuous extrusion and intermittent orientation and forming in rapid succession in an integrated in-line system.

Yet another object of the present invention is to provide a new and novel thermoplastic product forming method which extrudes, biaxially orients and forms thermoplastic products and minimizes, to an optimum degree, the time lag between the extrusion, orientation and forming stages thereof.

Yet another object of the present invention is to provide an integrated method for forming biaxially oriented thermoplastic products in a continuous extrusion, orientation and forming process which achieves higher basic linear speeds than has heretofore been accomplished while interfacing intermittent orientation and forming means with continuous extrusion means to preserve the dimensional, orientational and thermal state of the material through the interface.

Yet another object of the present invention is to provide a method for thermoforming biaxially oriented thermoplastic products of enhanced quality.

These and other objects of the present invention will become more fully apparent with reference to the following specification and drawings which relate to several preferred embodiments of the present invention.

SUMMARY OF THE INVENTION

The process of the present invention commences with the continuous extrusion of a relatively narrow web of thermoplastic material from a die at a relatively high linear speed and which is extruded at the preferred orientation temperature. If the extrusion temperature is above the desired orientation temperature then it may be passed over cooling rolls in order to bring it down to the desired orientation temperature. The web leaves the cooling rolls and enters an accumulating zone where it is permitted to sag under the force of gravity in the provision of a fake or open loop dimensioned to interface the cyclic throw of the intermittent orienter and former with the continuous flow from the extruder. The web is then passed through differential speed rolls, if desired, to impart a predetermined maximum or partial amount of longitudinal or machine direction stretch orientation thereto and immediately subsequent to this orientation is passed into a transverse stretching station which consists basically of a pair of divergently disposed rotating saw blade-like devices which engage the web along each edge and divide it into a series of increments which are then continuously separated transversely to a distance of approximately three times the original dimension of the extruded web.

Since the longitudinal direction is also desirably oriented by stretching on an order of magnitude of three times the original dimension, if this has not been achieved by the stretching rolls upstream from the transverse stretching mechanism, the balance of the longitudinal stretching may be taken care of downstream from the transverse stretching apparatus. All of the foregoing stretching steps, however, are performed on a continuous and uninterrupted basis by the orientation apparatus over the extent of the cycle throw of the intermittently actuated orienter and former.

After the proper degree of orientation has been biaxially imparted to the extruded and now lengthened and widened web of material, the material is immediately transferred through an intermittent feed means timed coterminately with the actuation of the orienting apparatus and synchronized with the intermittent former to ingest a given incremental length of oriented web corresponding to a said cyclic throw of web and dispose it within the intermittent former for an immediately succeeding thermoforming cycle. Thus, because of coterminate and simultaneous actuation of the orientation apparatus and the intermittent feed means, effective means are provided to maintain the dimensional and orientational integrity and preserve the temperature in the web from the outlet of the orientation device into the intermittent former such that sufficient heat of extrusion and orientation is present to permit thermoforming.

Inertial and thermal discontinuities, if any, will exist only at the upstream and downstream extremities of the accumulator fake or loop, the ultimate extent of which is controlled by relative adjustment of the extrusion rate and cyclic period of the intermittent orienter and forming apparatus. Thus, if any such discontinuities exist they are at the extremes of the cyclic throw of the intermittent former, namely, in the selvage rather than in the finished products.

DETAILED DESCRIPTION OF THE DRAWINGS

Figure 1:
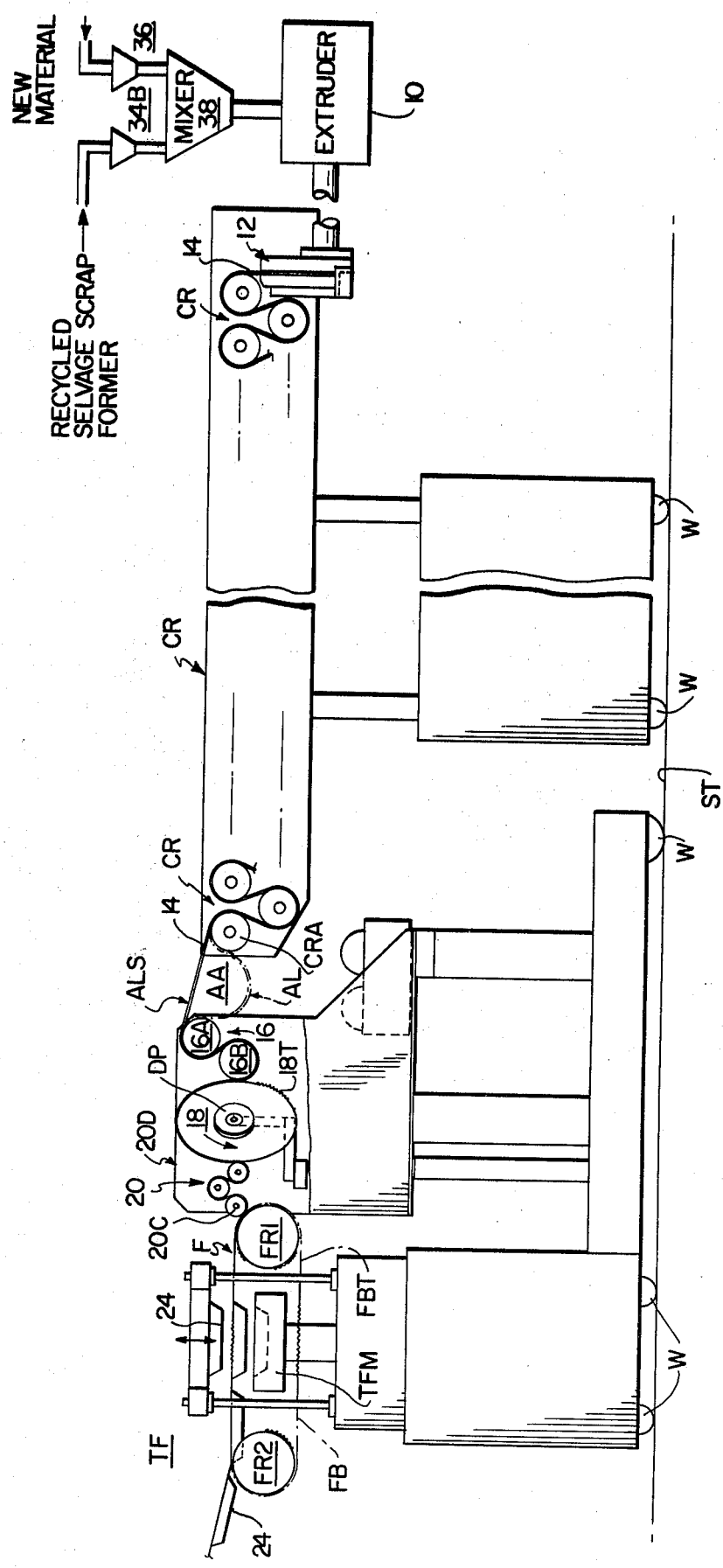
FIG. 1 is a schematic of an in-line continuous extrusion, and intermittent biaxial orientation and forming system of the present invention.
Figure 2:
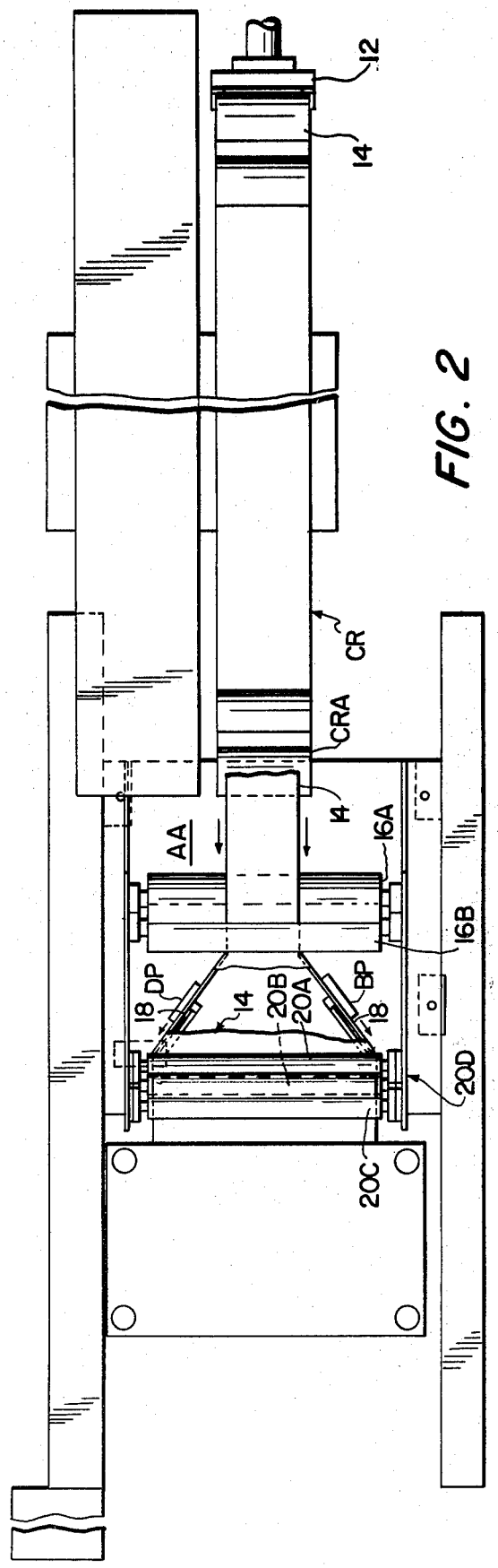
FIG. 2 is a top plan schematic of the system and FIG. 1.

Referring in detail to the drawings and with particular reference to FIGS. 1 and 2, an extruder 10 is illustrated as having an output to a die 12 which forms a narrow web 14 of polystyrene or other thermoplastic extrudate and feeds the said extrudate 14 into a bank of cooling rolls CR.

As illustrated, the extruder 10 and the die 12 feed an extrudate web 14 into a bank of cooling rolls CR which are provided, as is well known in the art, with a suitable heat exchange medium and control therefor, or which simply provide the proper reach of web material 14 for a given temperature of extrusion to permit it to cool sufficiently in the ambient conditions of the process equipment such that when it reaches an input roll assembly 16 it is at the proper temperature for orientation.

The input roller assembly 16 is illustrated as including a first roller 16A and a second roller 16B which receives the web 14 in a serpentine path therebetween and which rolls 16A and 16B are driven at differential rotational velocities to impart a longitudinal or machine direction orientation or stretch to the web 14 prior to the engagement of the said web 14 with the teeth 18T of a transverse stretcher blade assembly 18.

Intermediate the downstream cooling roll CRA in the cooling roll assembly CR and the upstream roll 16A of the input roll assembly 16 is an accumulation area AA in which the web 14 is permitted to form an accumulation loop AL as shown in phantom lines. This accumulation loop AL is formed under the action of gravity and in response to the timing differential caused by the interfacing of the continuous emission and cooling of the web 14 upstream of the accumulation area AA and the intermittent orienting and forming of the said web 14 downstream of the accumulation area AA.

The accumulation loop AL becomes taught, without stretching forces being applied, as indicated by the solid line mode ALS in FIG. 1. The accumulation loop AL pulsates or alternates between the sagging dotted line condition and the taught solid line mode ALS of the web 14 in concert with the intermittent action of the web feeding and transport apparatus F in the thermoformer TF downstream of the orientation apparatus as will be more fully apparent hereinafter.

As shown in FIGS. 1 and 2 assembly 20 is provided downstream of the transverse stretcher blade assembly 18 comprising first, second and third output rolls 20A, 20B and 20C extending downstream, in that order, from the transverse blade assembly 18. These rollers 20A, 20B and 20C may be driven at selectively differential rotational velocities to impart further longitudinal stretch, if desired, to the web 14 downstream of and subsequent to the impartation of transverse orientation thereto. The downstream output roller 20C is engaged with the surfaces of web advance feed belts FB of an intermittent feed device F by which the now oriented web material 14 will be carried into position in the intermittent thermoformer TF.

The output rollers 20A, 20B and 20C are mounted on a common frame 20D on which the input rollers 16A and 16B are also mounted.

Figure 4:
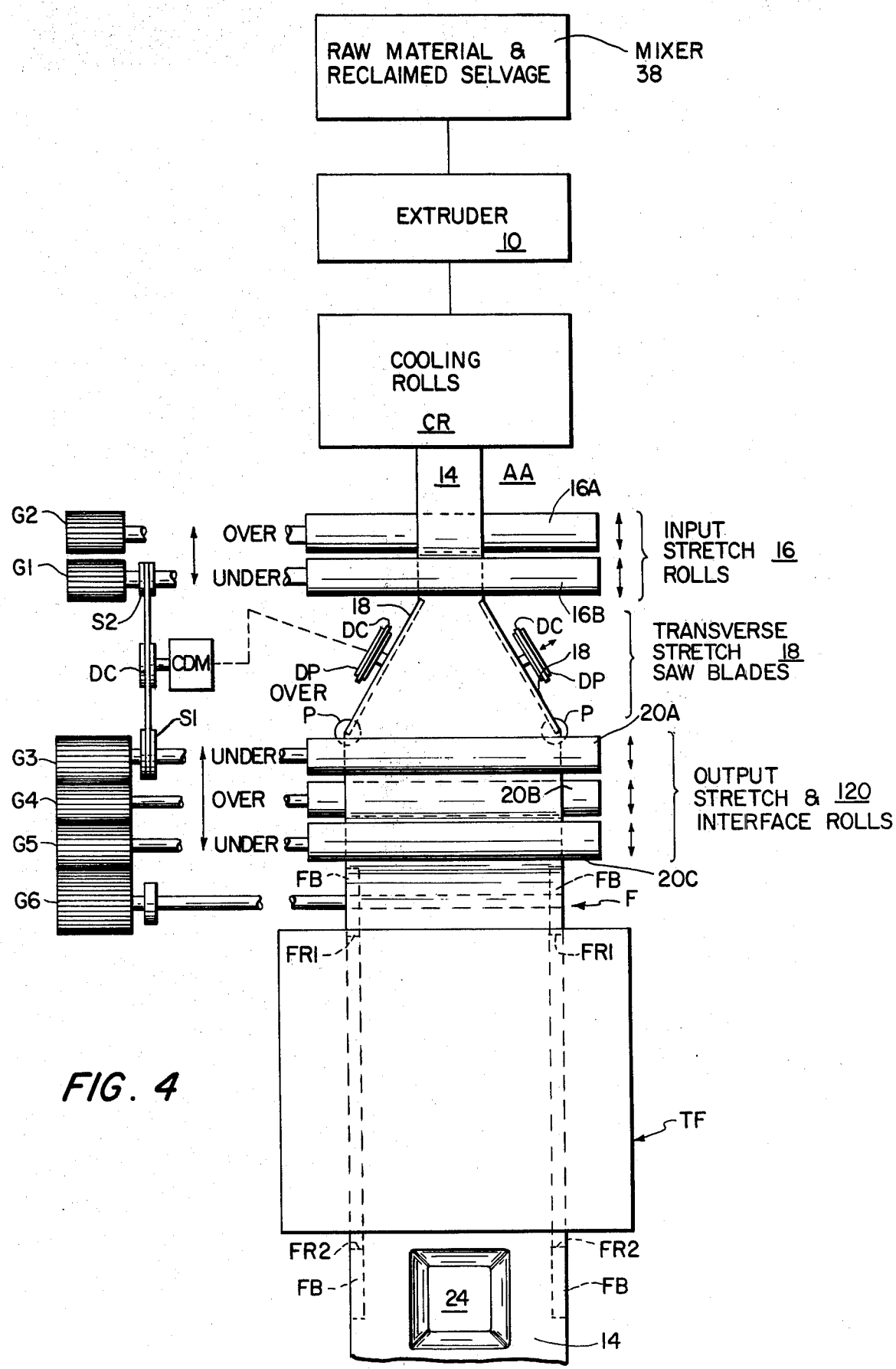
FIG. 4 is a schematic illustrating the common drive and timing of the present invention.

The transverse stretch saw blades 18 and the nearest rollers thereto, namely, the upstream input rollers 16A and 16B and the downstream output rollers 20A, 20B and 20C are all driven preferably from a common drive motor CDM through suitable drive belt means and the rollers 16B and 20A are illustrated in FIG. 4 as being driven by a common drive belt DC which engages drive pulleys or sprockets S1 and S2 mounted on the shafts of the rollers 20A and 16B, respectively.

Further, the roller 16B includes a driven output gearing G1 which is engaged with compatible gearing (of a predetermined ratio) G2 mounted on the shaft of the initial input roller 16A such that the differential speed between the rollers 16A and 16B can be effectuated from the same common drive means DC that drives both the rollers 16B and 20A.

Thus, the ratio of the gears G1 and G2 can be changed to vary the amount of longitudinal stretch achieved between the initial input rollers 16A and 16B.

The last two rolls 20B and 20C on the downstream side of the transverse stretcher blades 18 are also driven from the first gear G1 of the stretcher apparatus in like manner by gears G3, G4 and G5. The last output (interface) roll 20C is driven at the surface speed of the feed belts FB of the intermittent web advance F and this is driven in turn by the upstream sprocket FR1. These upstream sprockets FR1 are driven by suitable gearing G6 in synchronism with the intermittent orientation mechanism 16-18-20.

In order to maintain a constant dimensional relationship between the transverse stretch saw blades 18 and the initial output roller 20A, the blades 18 are pivoted at their most downstream edges on the respective pivots P, rather than at the center of the said blades 18. Therefore, the relationship between these blades 18 and the output roller 20A remains constant during adjustment of the blades between a direction parallel to the machine direction oriented at 45° with respect to the machine direction.

The second input roller 16B and its companion input roller 16A in the input stretch roll set 16 may be moved in and out to adjust to the position of the transverse stretch saw blades 18 depending upon the adjusted position of the latter. Suitable stop means or bosses (not shown) are provided on the saw blade adjustment brackets to interact with the mounting of the various input rollers 16A and 16B to preclude engagement of the rolls with the saw blade but maintaining the desired immediate proximity thereof.

Suitable means (not shown) are also provided within the mounting bracket 20D of the output roll set 20 to provide for moving the three output rollers 20A, 20B and 20C apart and back together again to provide for the threading of material therethrough at the beginning of an extrusion and orientation and molding cycle and then placing the rollers under a sufficient bias to provide a predetermined minimum spacing and pressure thereon such as by small air cylinders or the like, all of which is within the purview of one of ordinary skill in the art.

The endless feed belts FB of the intermittent feeder F are disposed about input sprockets FR1 and output sprockets FR2 such that opposite selvage edges of the oriented web 14 will be gripped by the feed belts FB. Thus, the web 14, with its dimensional integrity preserved, will be indexed through a reciprocating or intermittent thermoformer TF.

The feed belts FB may be equipped with rows of upstanding teeth FBT such that these teeth pierce the selvage edges of the web 14 to preserve its dimensional integrity and hence, its orientation. The thermoformer TF ingests a predetermined throw length of biaxially oriented web 14 for each intermittent enablement of the web feed mechanism F and biaxial orientation mechanism 16-18-20. The intermittent thermoformer TF is in synchronism with these intermittent feed mechanisms through suitable transmissions and the like such that the common drive motor CDM (or other equivalent power means not shown) controls the interaction of all of these mechanisms. Therefore, when the feed belts FB are stopped the thermoformer TF will close its molds TFM to produce a molded product 24 in the advanced biaxially oriented web 14. Then the molds FM will be opened again prior to the commencement of the next advance cycle of the web 14 from the accumulator loop AL by the intermittent feed mechanism F and the associated and synchronized biaxial orientation means 16-18-20.

Figure 3:
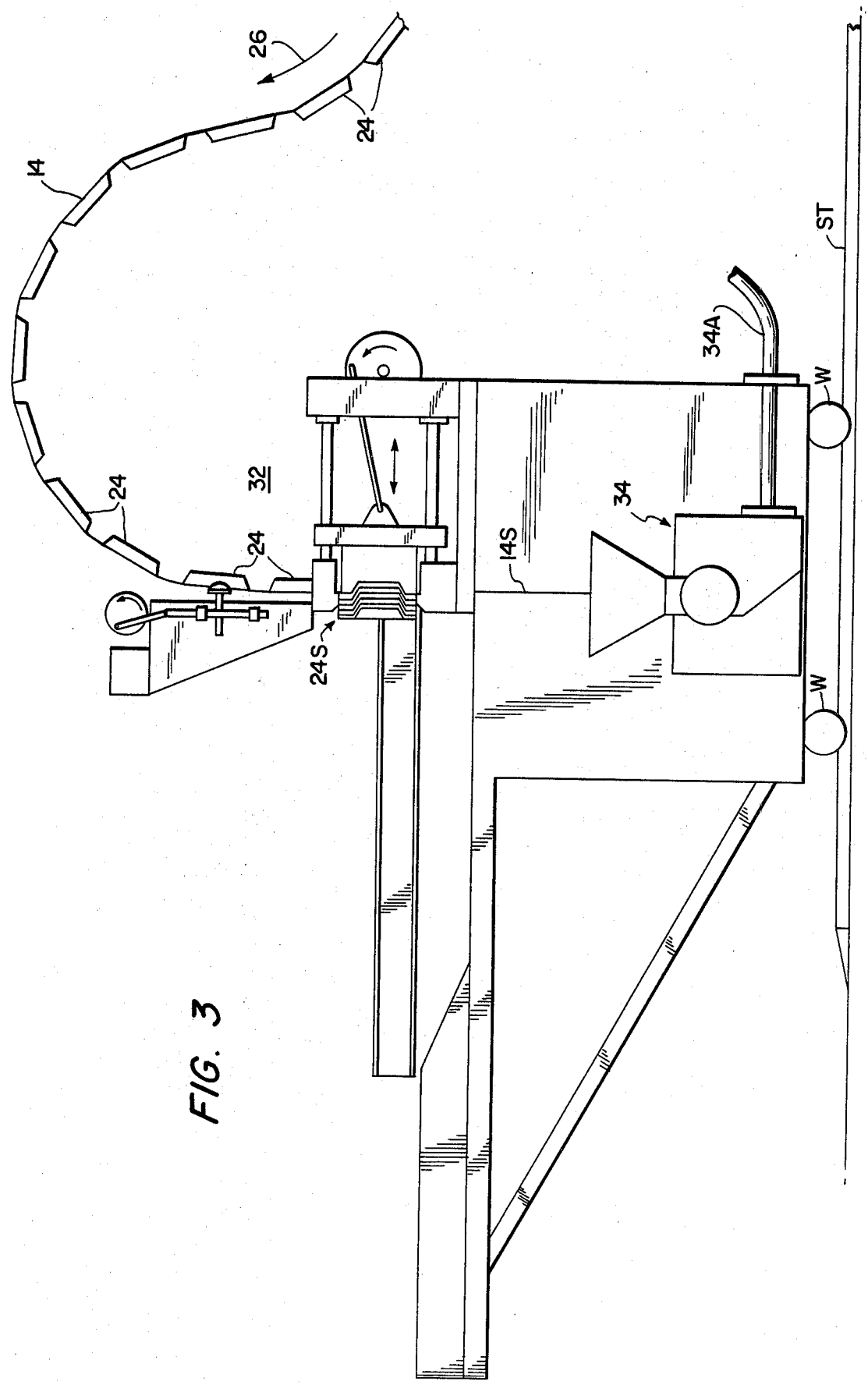
FIG. 3 is a schematic of the cutting, stacking and selvage recycling mechanism of the present invention.

The advance of the web 14 clears the formed products 24 from the molds TFM and carries them toward the cutting and stacking station 23 of FIG. 3.

Each advance of the web 14 by the feed belts FB causes the accumulator loop to shift from the sagging phantom line position to the solid line position in the manner best illustrated in FIG. 1. Then, during the thermoforming cycle of the thermoformer TF the accumulator loop AL resumes the sagging phantom line position awaiting the next intermittent advance of the web 14 through the orienter 16-18-20 and web advance mechanism F. Then, when the thermoformer TF is opened to discharge the formed products 24, the next intermittent orientation and feed cycle occur and the accumulator loop AL once more assumes the solid line taught position of FIG. 1.

In operation, in the biaxial orientation mechanism 16-18-20 the circular saw blades 18 are adjustable about the pivot means P between a maximum divergence of 45° to the machine direction or product center line and a direction parallel to that center line and are driven about their respective central blade axes by means of drive pulleys DP which are also positioned for movement with the blades 18 about the said respective pivot means P.

The teeth 18T about the periphery of each blade 18 engage the outermost edges of the web 14 and cause it to change from its initial extruded dimension at the input side of the blades to a much wider dimension commensurate with the divergence at which the blades are set at the output side thereof. In this manner, a transverse orientation is imparted to the web 14 in a continuous manner as it traverses the transverse orientation blades 18 from the input roll assembly 16 to the output roll assembly 20.

In practice, the longitudinal stretching or machine direction stretching or orientation can be carried out immediately before or immediately after the transverse stretching or half before and half after the said transverse stretching. Furthermore, any other ratio of initial machine direction stretch and final machine direction stretch is also feasible. The degree of transverse or longitudinal orientation can be varied to suit a particular product which may have depth or shape requiring less initial orientation of the sheeting in one or another direction. Therefore, the present invention provides a system which is very facile and variable with regard to unique and unusual molded shapes.

In the present invention, the amount of selvage which falls outside of the transverse stretcher blades 18 is the same as that amount of selvage which falls outside of the upstanding teeth FBT on the feed belts FB of the intermittent feed mechanism F.

A wide variety of longitudinal and transverse stretch modes can be effectuated with the present invention. In all cases, of course, the transverse stretching is achieved within the zone EF and not within the upstream and downstream zones BE and FK, respectively.

Referring further to FIGS. 1, 3 and 4, the diameter of the rolls 16A, 16B, 20A, 20B and 20C are kept as small as is consistent with minimizing the deflection of these rolls under load. This lends lateral stiffness to the web 14 and reduces shrinkback and attendant loss of orientation. Also, the distance between the rolls in the respective roll sets 16 and 20 is preferably no greater than to allow for slight clearance of the web or extrudate 14 which further minimizes the shrinkback which otherwise occurs as the material is transferred from one roll to another.

The surface speed of the second roll 16B is usually faster than the surface speed of the first roll 16A so as to achieve longitudinal stretch upstream of the saw blades 18. If the said surface speed of the roller 16B is twice that of the roller 16A, then 50% of the longitudinal or machine direction orientation occurs in the transfer of material between the tangent points of the web 14 on the rollers 16A and 16B, respectively.

Also as shown in FIG. 1, the teeth 18T on the transverse stretcher blades 18 are very close to the surface of the second roller 16B. The perimeter speed of the blades 18 is preferably slightly faster but substantially equal to the surface speed of the roller 16B thereby making the transfer of material from one to the other more effective. The teeth 18T actually penetrate the edge of the web or strip 14 so as to hold the material securely as transverse stretching takes place due to the angular orientation of the blades 18, the latter being best shown with reference to FIGS. 2 and 4.

The initial output roller 20A is also positioned very close to the teeth 18T of the blades 18 so as to minimize shrinkback at this particular transfer point comprised by the interface between the said roll 20A and the blades 18. The surface speed of the roller 20A is usually and preferably slightly faster but substantially equal to the perimeter speed of the transverse stretching blades 18, the second output roller 20B is maintained close to the first output roller 20A, and the third output roller 20C close to the second output roller 20B, in order to minimize shrinkback during the transfer from one roller to another. Usually, the second output roller 20B and the third output roller 20C are run twice the peripheral speed of the first output roller 20A with the preferred speed being such as to accomplish the remaining 50% of the longitudinal or machine direction orientation in the web 14 as illustrated. The web 14, as it leaves the third output roller 20C onto the feed belts FB is thus fully biaxially oriented.

All of the longitudinal stretching rollers 16A, 16B, 20A and 20B and the third output roller 20C are preferably coated with fluorocarbon such as Teflon to avoid sticking of the web 14 thereto. Also, such rollers are usually made with thin-walled steel tubes in order to minimize the heat retention capacity and heat transfer to the ends of the rollers. Therefore, in the area of contact with the web 14, the rolls reach about the same temperature as that of the web itself and thus maintain thermal stability and uniformity in the web 14. Heat may also be applied to the rolls and drum by any suitable means known in the art.

Reference is now made to FIGS. 1 and 3 in which the molded products 24 traveling in the direction 26 are delivered to a reciprocating and stacking means 32 which severs the molded products 24 from the selvage of the web 14 and causes the said severed products 24 to be stacked in a suitable product stack 24S which is schematically shown.

While the severed products travel to a stack 24S, the selvage 14S travels to a selvage grinding and recycling means 34 which blows the ground selvage through a conveyor tube 34A to a recycling hopper 34B adjacent a hopper 36 fed from a tube 36A from a source of new plastic granules or pellets to place both reground selvage and the pellets into a mixer assembly 38 of a type well-known in the art to redirect both fresh raw material and recycled selvage into the extruder 10.

In all of the embodiments of FIGS. 1, 2 and 3, the various equipment modules such as the cooling roll apparatus, the orienting apparatus, the former and the cutting press and granulating apparatus for reclaiming the selvage are mounted on a guide track ST on a supporting floor or the like such that these various units can be placed together in a dimensionally desirable relative orientation to define the final in-line system of the present invention. Suitable rollers or wheels W on each of the various components are illustrated schematically as riding along the guide tracks ST.

In any of the foregoing embodiments of the present invention, an important concept is always to positively restrict shrinkback of the oriented sheet by holding the dimensional integrity and the thermal stability of the sheet 14 to as close a tolerance as possible.

The thermal integrity of the web 14 subsequent to its orientation is also of importance since the temperature of the oriented web 14 in the system of the present invention is preferably sufficient for the thermoforming operation to be performed by the downstream thermoformer TF. The temperature of the web 14 is controlled, as previously disclosed by the roll or drum structure and/or auxiliary heating means of any suitable type known in the art.

The dimensional integrity of the biaxially oriented and thermally maintained web 14 which exits from the output roller 20C of the intermittent orientation means 16-18-20 is maintained by the teeth FBT on the feed belts FB of the intermittent feed mechanism F such that a properly oriented and stabilized sheet of thermoplastic material 14 is incremented within the thermoformer TF at a proper temperature for thermoforming the products 24 therein. The cooling of the incremental section of web 14 fed to the thermoformer TF is accomplished by the thermoformer TF while the product 24 is in the mold and thus, when the web 14 bearing the product 24 and including the selvage scrap 14S leaves the thermoformer TF, the products 24 have been fixed in their oriented and formed condition.

Figure 5:
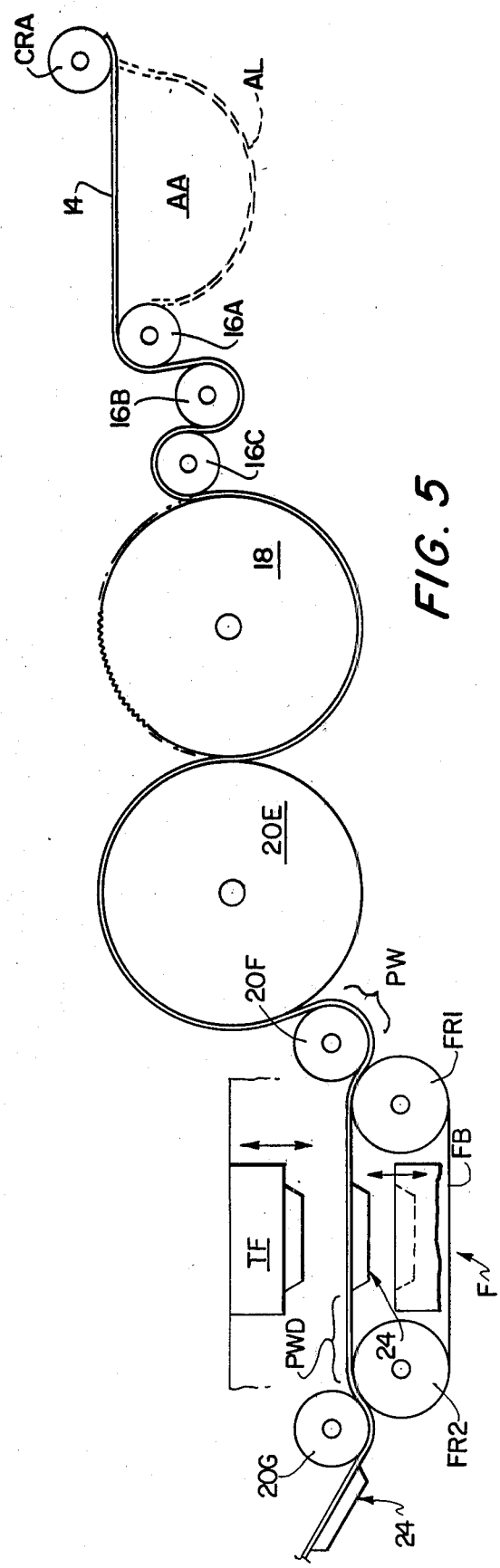
FIG. 5 is a schematic of an alternative embodiment of the in-line continuous extrusion and intermittent biaxial orientation and forming system of the present invention.

The present invention combines relatively short cycles (20 to 30 cycles per minute) and correspondingly rapid extrusion rates with relatively thick polystyrene sheeting on the order of 0.030 inches and up in a preferred operating mode. Orientation temperatures on the order of 260° F. are considered optimum for retained orientation in OPS material. Slightly higher temperatures such as 275° F. have been found to be less desirable for retention of orientation. The preferred longitudinal orientation mode is 50% elongation upstream of transverse orientation and 50% downstream thereof in the input and output roller assemblies 16 and 20, In an alternate embodiment of the present invention, referring to FIG. 5, the three output rollers 20A, 20B and 20C of the orientation means 16-18-20 of FIGS. 1, 2 and 4 are replaced by two output rollers 20E and 20F, the upstream output roller 20E being much larger in diameter than the downstream output roller 20F. The larger upstream output roller 20E is so sized as to ingest substantially a complete throw of at least partially oriented web 14 corresponding to a cycle of the intermittent web feed means F. The portion PW of the oriented web 14 engaging the smaller downstream output 20F is constrained to pass through the thermoformer TF into a downstream selvage portion PWD relative to the molded product 24 such that any physical or thermal discontinuities occasioned by the smaller roller 20F will not appear in the molded product 24.

Therefore, the molded product 24 will be thermoformed in that portion of the web 14 on the feed belts FB which was formerly on the surface of the larger output roller 20E.

In this embodiment it should be noted that the feed of the web 14 is inverted on the transverse blades 18 and that a third upstream input roller 16C is required. Also, a third downstream roller 20G is now provided at the downstream end of the feed belts FB adjacent the downstream sprockets FR2 to stabilize the oriented web 14 on the feed means F. Suitable drive gearing interconnects all the rollers 16A, 16B, 16C, 20E, 20F, 20G, drive sprocket RF1 and transverse stretcher blades 18 in a similar manner to that described in connection with FIG. 4.

Therefore, it can be seen that the present invention provides a means for interfacing between a continuous extrusion mode and an intermittent orienting and forming mode without either mode adversely affecting the integrity of the other or the quality and integrity of the biaxially oriented thermoplastic material in the system.

It should be understood that the METHOD FOR THE CONTINUOUS FORMATION OF BIAXIALLY ORIENTED THERMOPLASTIC MATERIALS AND FORMING ARTICLES THEREFROM BY INTERMITTENT FORMING MEANS INTERFACED THEREWITH of the present invention may be modified as would occur to one of ordinary skill in the art without departing from the spirit and scope of the present invention.

It is claimed:

1. The method of forming products of biaxially oriented thermoplastic material comprising:

continuously extruding and providing a web of thermoplastic material;

intermittently ingesting said continuously provided web into intermittently activated biaxial orientation means and biaxially orienting a predetermined throw of said web for each intermittent actuation of said biaxial orientation means;

interfacing said continuously provided web with the said intermittent means by accumulating said continuously provided web in an open loop configuration;

said open loop configuration and said throw of said web being compatibly dimensioned such that each throw of web ingested into said intermittently actuated orientation means will transform the said web from said open loop configuration to a taught substantially straight line configuration substantially devoid of stretching forces;

the compatible dimensions of said throw of said web and said open loop configuration constraining any physical and thermal discontinuities in said web to positions substantially immediately proximate to the extreme ends of each said loop and each said throw; and intermittently and immediately ingesting each throw of said biaxially oriented web from said biaxial orienting means into an intermittently actuated thermoformer means synchronized therewith and forming products in that portion of the biaxially oriented throw of said web intermediate said discontinuities.

2. The method of claim 1 which further includes:
separating the formed products from said web; and
recycling the remainder of said web for further extrusion.

3. The method of claim 2, wherein said remainder of said web is first granulated during said recycling.

4. The method of claim 1, which further includes:
separating and accumulating said formed products from said web;
granulating the remainder of said web; and
recycling said granulated remainder of said web for further extrusion.

5. The method of extruding and orienting a web of thermoplastic material in a continuous mode and subsequently forming molded products therefrom in an intermittent mode without interruption of said continuous mode, comprising:

extruding a web of thermoplastic material and presenting it continuously to an orientation means at an optimum orientation temperature;

intermittently stretch orienting the web in a biaxial orienting means to a desired degree in the transverse and longitudinal dimensions thereof while said web is in a continuous longitudinal motion over predetermined intermittent throw lengths thereof;

intermittently extracting the oriented predetermined throw lengths of the oriented web from the biaxial orienting means in synchronism with the intermittent actuations of the latter and ingesting the said throw lengths into a forming means; and intermittently forming products in said throw lengths of oriented web with said forming means while preserving the integrity of orientation therein.

6. The method of claim 5, which includes the further step of:
stripping said formed products and the remainder of said web from said forming means.

7. The method of claim 6, which includes the further step of:
separating the formed products from the web; and
recycling the remainder of said web for further extrusion.

8. The method of claim 7, which further includes stacking the formed products separated from said remainder of said web.

9. The method of claim 5, which includes the further steps of:
separating the formed products from the web; and
recycling the remainder of said web for further extrusion.

10. The method of claim 9, which further includes stacking the formed products separated from said remainder of said web.

11. The method of any one of claims 1–10, wherein the thermoplastic material is polystyrene.

12. The method of any one of claims 1–10, wherein in said biaxial orientation means, 50% of the orientation of said predetermined throw lengths of said web in the longitudinal direction is performed both upstream and downstream of the transverse orientation thereof.

13. The method of any one of claims 1–10, wherein in said biaxial orientation means, 50% of the orientation of said predetermined throw lengths of said web in the longitudinal direction is performed both upstream and downstream of the transverse orientation thereof; and wherein said thermoplastic material is polystyrene.

14. The method of forming products of biaxially oriented thermoplastic material comprising:

continuously extruding a web of thermoplastic material;

biaxially stretching said web in an intermittently actuated biaxial orientation means in a continuous manner over a predetermined throw length of each actuation of said orientation means to effect biaxial orientation therein and dimension said web for subsequent forming;

interfacing said continuously extruded web with said intermittently actuated orientation means in a dimensionally and thermally stable manner through a gravity formed accumulation loop sized in accordance with said predetermined throw length;

substantially immediately and in synchronism with said orientation means transferring a said throw length of oriented web from said orientation means onto a downstream transfer means while maintaining the dimensional integrity of said web; and forming products in said intermittently advanced lengths of said web on said transfer means substantially immediately upon the completion of each advance to enhance thermal stability therein and preserve said orientation.

15. The method of claim 14, which further includes:
separating formed products from the remainder of said web; and
recycling said remainder of said web for extrusion back into a said web.

16. The method of claim 15, wherein said remainder of said web is first granulated during said recycling.

17. The method of claim 14, which further includes:
separating and accumulating said formed products from the remainder of said web;
granulating said remainder of said web; and
recycling said granulated remainder of said web for extrusion.

18. The method of any one of claims 14–17, in which the thermoplastic material is polystyrene.

19. The method of any one of claims 14–17, wherein in said biaxial orientation means, 50% of the orientation of said predetermined throw lengths of said web in the longitudinal direction is performed both upstream and downstream of the transverse orientation thereof.

20. The method of any one of claims 14–17, wherein in said biaxial orientation means, 50% of the orientation of said predetermined throw lengths of said web in the longitudinal direction is performed both upstream and downstream of the transverse orientation thereof; and wherein said thermoplastic material is polystyrene.

21. The method of extruding a web of thermoplastic material in a continuous mode and subsequently orienting and forming molded products therefrom in an intermittent mode without interruption of said continuous mode, comprising:

extruding a web of thermoplastic material and presenting it continuously to an intermittently actuated orientation means at an optimum orientation temperature through a gravity formed accumulator loop accommodating a predetermined throw length of web;

stretch orienting the said predetermined throw length of web to a desired degree in the transverse and longitudinal dimensions thereof while said web is in continuous longitudinal motion over a given intermittent actuation cycle of said orientation means;

continuously interfacing and juxtaposing said oriented throw of web during said given actuation cycle with a downstream transfer means synchronized with said orientation means in a dimensionally and thermally stable engagement therewith to preserve the integrity of the orientation and the temperature therein and to establish an intermittent feed mode of said web downstream of said orientation means without disturbing the continuous mode upstream thereof;

said downstream transfer means being the input of an intermittent thermoforming means; and intermittently forming products in said incremental lengths of oriented web within said thermoforming means substantially immediately upon receipt thereof to enhance the thermal stability of said web while preserving the integrity of orientation therein.

22. The method of claim 21, which includes the further steps of:
cooling the formed products and the web in the intermittent forming means; and
stripping said formed products and the remainder of said web from said forming means.

23. The method of claim 22, which includes the further steps of:
separating the formed products from said remainder of said web; and
recycling said remainder of said web for further extrusion.

24. The method of claim 23, which further includes stacking the formed products separated from said remainder of said web.

25. The method of claim 21, which includes the further steps of:
cooling the formed products and the web in the intermittent forming means;
separating the formed products from the remainder of said web; and
recycling said remainder of said web for further extrusion.

26. The method of claim 25, which further includes stacking the formed products separated from said remainder of said web.

27. The method of any one of claims 21–26, wherein the thermoplastic material is polystyrene.

28. The method of any one of claims 21–26, wherein in said biaxial orientation means, 50% of the orientation of said predetermined throw lengths of said web in the longitudinal direction is performed both upstream and downstream of the transverse orientation thereof.

29. The method of any of claims 21–26, wherein in said biaxial orientation means, 50% of the orientation of said predetermined throw lengths of said web in the longitudinal direction is performed both upstream and downstream of the transverse orientation thereof; and wherein said thermoplastic material is polystyrene.

* * * * *